United States Patent
Lee

(10) Patent No.: US 9,731,711 B2
(45) Date of Patent: Aug. 15, 2017

(54) OXYGEN SENSOR DIAGNOSIS CONTROL SYSTEM OF HYBRID ELECTRIC VEHICLE

(71) Applicant: Hyundai Motor Company, Seoul (KR)

(72) Inventor: Jea Mun Lee, Seoul (KR)

(73) Assignee: Hyundai Motor Compnay, Seoul (KR)

( * ) Notice: Subject to any disclaimer, the term of this patent is extended or adjusted under 35 U.S.C. 154(b) by 0 days.

(21) Appl. No.: 14/957,716

(22) Filed: Dec. 3, 2015

(65) Prior Publication Data

US 2016/0355174 A1    Dec. 8, 2016

(30) Foreign Application Priority Data

Jun. 8, 2015  (KR) .................. 10-2015-0080285

(51) Int. Cl.
| | |
|---|---|
| B60W 20/00 | (2016.01) |
| B60K 6/387 | (2007.10) |
| B60W 20/50 | (2016.01) |
| B60W 20/14 | (2016.01) |
| B60W 30/18 | (2012.01) |
| F01N 11/00 | (2006.01) |
| F02D 41/14 | (2006.01) |
| F02D 41/02 | (2006.01) |
| F02N 11/08 | (2006.01) |
| F02D 41/12 | (2006.01) |

(52) U.S. Cl.
CPC ............ B60W 20/50 (2013.01); B60K 6/387 (2013.01); B60W 20/14 (2016.01); B60W 30/18127 (2013.01); F01N 11/007 (2013.01); F02D 41/022 (2013.01); F02D 41/1454 (2013.01); F02D 41/1495 (2013.01); F02N 11/0829 (2013.01); B60W 2400/00 (2013.01); B60Y 2200/92 (2013.01); B60Y 2300/431 (2013.01); F01N 2560/025 (2013.01); F01N 2900/0416 (2013.01); F02D 41/123 (2013.01); F02D 2200/503 (2013.01); Y10S 903/902 (2013.01)

(58) Field of Classification Search
CPC ....... B60W 20/50; B60W 20/14; B60K 6/387; F02D 41/022; F01N 11/00
USPC ..................... 701/22, 109; 123/295
See application file for complete search history.

(56) References Cited

U.S. PATENT DOCUMENTS

| 5,960,765 A | * | 10/1999 | Iida ................... F02D 37/02 123/295 |
| 8,897,995 B2 | * | 11/2014 | Kurtz ................. F02D 41/0025 701/109 |
| 2009/0254243 A1 | | 10/2009 | Uchihashi et al. |

FOREIGN PATENT DOCUMENTS

| JP | 2002-004935 A | 1/2002 |
| JP | 2014-043851 A | 3/2014 |

(Continued)

*Primary Examiner* — Tan Q Nguyen
(74) *Attorney, Agent, or Firm* — Mintz Levin Cohn Ferris Glovsky and Popeo, P.C.; Peter F. Corless

(57) ABSTRACT

An oxygen sensor diagnosis control system of a hybrid electric vehicle is provided. The system of a hybrid electric vehicle eliminates an uncertainty of the number of diagnoses of an oxygen sensor and restrains diagnoses of the oxygen sensor in a hybrid electric vehicle. The system of a hybrid electric vehicle includes a hybrid controller operates a vehicle, and determines conversion of an oxygen sensor diagnosis mode based on a result obtained by calculating an oxygen sensor diagnosis index. Additionally, the controller determines whether a condition for diagnosing an oxygen sensor is satisfied when the oxygen sensor diagnosis index decreases to initiate a diagnosis inducing mode or a compulsory diagnosis mode.

7 Claims, 3 Drawing Sheets

(56) References Cited

FOREIGN PATENT DOCUMENTS

| | | |
|---|---|---|
| JP | 2014-172499 A | 9/2014 |
| KR | 10-2011-0062135 A | 12/2011 |
| KR | 10-1090808 | 12/2011 |
| KR | 10-2013-0034457 | 5/2013 |
| KR | 10-2014-0026038 | 5/2014 |

* cited by examiner

OXYGEN SENSOR DIAGNOSIS CONTROL SYSTEM OF HYBRID ELECTRIC VEHICLE

CROSS-REFERENCE TO RELATED APPLICATION

This application claims under 35 U.S.C. §119(a) the benefit of Korean Patent Application No. 10-2015-0080285 filed on Jun. 8, 2015, which is incorporated by reference herein in its entirety.

BACKGROUND (a) Technical Field

The present invention relates to an oxygen sensor diagnosis control system of a hybrid electric vehicle and more particularly, it relates to an oxygen sensor diagnosis control system of a hybrid electric vehicle for eliminate an uncertainty of the number of diagnoses of an oxygen sensor and restrain unnecessary diagnoses of the oxygen sensor in a hybrid electric vehicle.

(b) Background Art

Generally, oxygen sensors are mounted in hybrid electric vehicles (HEV) to satisfy the exhaust gas rules, and diagnostic functions for diagnosing activation of oxygen sensors are provided to satisfy the On Board Diagnostic (OBD) rules that have recently been reinforced in the industry. In a hybrid vehicle, the diagnostic functions are performed by a hybrid controller (HCU) for configured to operate an overall function of the vehicle and an engine management system (EMS) configured to operate an engine. Engaging or disengaging the engine and injection of a fuel are determined by the HCU, and the EMS operates the engine under the control of the HCU.

In the hybrid vehicle, a diagnosis of an oxygen sensor is repeatedly performed every driving cycle to satisfy the rules in the industry. Accordingly, the diagnoses of the oxygen sensor may be performed unnecessarily or less frequently based on the driver and the road environment. Due to the differences of drivers and road conditions, a diagnosis condition of an oxygen sensor is set more widely to satisfy the rules, but the rule satisfaction result is uncertain.

The above information disclosed in this section is merely for enhancement of understanding of the background of the invention and therefore it may contain information that does not form the prior art that is already known in this country to a person of ordinary skill in the art.

SUMMARY

The present invention provides an oxygen sensor diagnosis control system of an HEV for satisfying the diagnostic rules of an oxygen sensor and preventing reduction of a driving efficiency due to frequent diagnoses of the oxygen sensor.

According to one aspect, an exemplary embodiment of the present invention provides an oxygen sensor diagnosis control system of a hybrid electric vehicle that may include a hybrid controller that may be configured to collect driving state information of the hybrid electric vehicle and operates including an engine and a driving motor. The hybrid controller may be configured to determine conversion of an oxygen sensor diagnosis mode based on a result obtained by calculating an oxygen sensor diagnosis index, and to determine when a condition for diagnosing an oxygen sensor is satisfied when the oxygen sensor diagnosis index decreases and initiates a diagnosis inducing mode or a compulsory diagnosis mode.

In some exemplary embodiments any one of a condition in which an state of charge (SOC) of a battery is a predetermined value or less and a condition in which a regenerative brake power is a predetermined value or more may be dissatisfied when the oxygen sensor diagnosis index decreases causing initiation of the diagnosis inducing mode may occur while the vehicle is coasting. The hybrid controller may be configured to maintain the disengagement of the fuel injection of an engine and connect an engine clutch to satisfy a condition for diagnosing the oxygen sensor to induce the diagnosis of the oxygen sensor.

When the oxygen sensor diagnosis index decreases and the compulsory diagnosis mode may be initiated while the vehicle operates in a coasting state, the hybrid controller may be configured to restrict the regenerative brake regardless of the SOC of a battery. The regenerative brake power value may connect the engine clutch, and may maintain disengagement of the fuel injection to satisfy a condition for diagnosing the oxygen sensor to induce the diagnosis of the oxygen.

In response to determining that the fuel injection while the vehicle travels is switched on and the EMS may diagnose the oxygen sensor when the oxygen sensor diagnosis index decreases to initiate the compulsory diagnosis mode, the hybrid controller may be configured to compulsorily disengage the fuel injection to satisfy a condition for diagnosing the oxygen sensor to induce the diagnosis of the oxygen sensor.

In response to determining that the fuel injection may be disengaged (e.g., off state) and the vehicle may be stopped when the oxygen sensor diagnosis index decreases to initiate the compulsory diagnosis mode. Accordingly, the hybrid controller may be configured to compulsorily operate the engine to engage the fuel injection of the engine, and when EMS diagnoses the oxygen sensor, the hybrid controller may be configured to disengage the fuel injection to satisfy a condition for diagnosing the oxygen sensor to induce the diagnosis of the oxygen sensor.

The oxygen sensor diagnosis control system of an HEV according to the present invention may eliminate an uncertainty of the number of diagnoses of an oxygen sensor of the HEV to reduce a dissatisfaction of the related rules. Further unnecessary diagnoses of the oxygen sensor may be minimized to reduce the number of diagnoses of the oxygen sensor that have been excessively performed to avoid the dissatisfaction of the rules.

BRIEF DESCRIPTION OF THE DRAWINGS

The above and other features of the present invention will now be described in detail with reference to certain exemplary embodiments thereof illustrated by the accompanying drawings.

DETAILED DESCRIPTION

Figure 1:
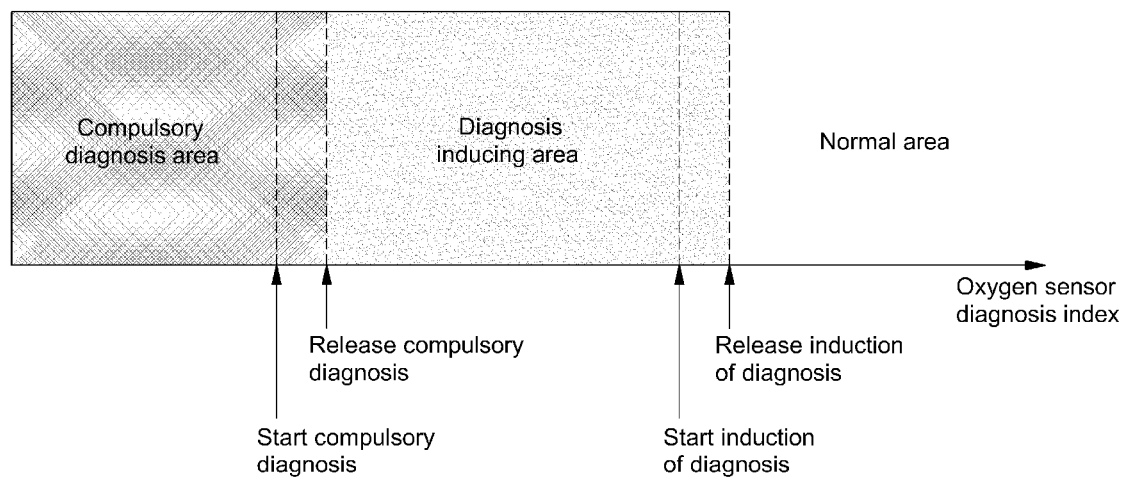
FIGS. 1 and 2 are exemplary schematic views illustrating an oxygen sensor diagnosis mode determination method (area) according to an oxygen sensor diagnosis index of an HEV an exemplary embodiment of the present invention.

Hereafter, the present invention will be described so that those skilled in the art to which the present invention pertains can easily carry out the invention. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention relates to control of diagnoses of an oxygen sensor of a hybrid electric vehicle HEV, and may improve performance related to a rate base monitoring (RBM) rules by optimizing the number of diagnoses of an oxygen sensor of an engine management system (EMS). As known in the art, the oxygen sensor diagnosis index is calculated using the number of diagnoses and a denominator. For example, the denominator is determined through a denominator determination reference determined by the RBM rules. Accordingly, the oxygen sensor diagnosis index of the vehicle varies based on the number of diagnoses of the oxygen sensor. For example, the oxygen sensor diagnosis index refers to a ratio of the number of diagnoses of an oxygen sensor (numerator) to the number of travels (denominator). When the vehicle travels in a condition determined by the rules, the denominator increases, and when a diagnosis is performed, the numerator increases. In other words, the oxygen sensor diagnosis index functions as an index for informing the user of how frequently the diagnoses of the oxygen sensor are performed.

Figure 2:
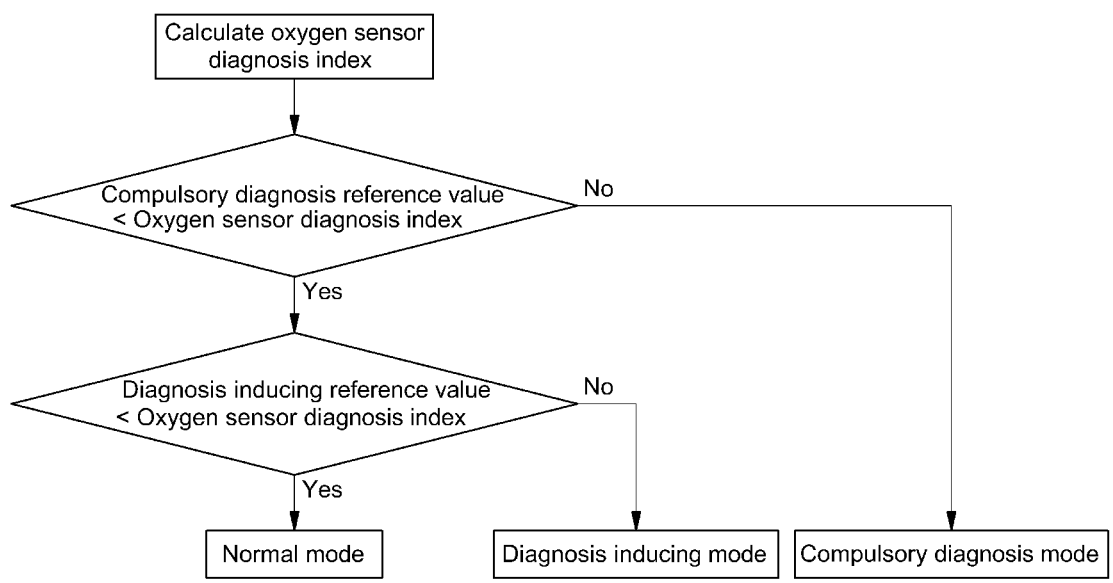

FIGS. 1 and 2 are exemplary schematic views illustrating an oxygen sensor diagnosis mode determination method (area) based on an oxygen sensor diagnosis index of an HEV. Referring to FIGS. 1 and 2, the hybrid controller (HCU) may determine the conversion of an oxygen sensor diagnosis mode based on a result obtained by calculating an oxygen sensor index, and may be configured to convert an oxygen sensor diagnosis mode into a compulsory diagnosis mode (e.g., diagnose an oxygen sensor in a compulsory diagnosis mode). When an oxygen sensor diagnosis index is a compulsory diagnosis reference value or greater, the oxygen sensor diagnosis mode may be converted into a diagnosis inducing mode (e.g., diagnose the oxygen sensor in a diagnosis inducing mode). When the oxygen sensor diagnosis index is a diagnosis inducing reference value or greater and is less than the compulsory diagnosis reference value, the oxygen sensor diagnosis mode may be converted into a normal mode or may maintain the oxygen sensor diagnosis mode in the normal mode (e.g., diagnose the oxygen sensor in a normal mode) if the oxygen sensor diagnosis index is less than the diagnosis inducing reference value.

The hybrid controller (HCU) may be configured to calculate the oxygen sensor diagnosis index in a general method based on the settings and determine the oxygen sensor diagnosis mode based on the calculation result. For example, when a condition for diagnosing the oxygen sensor in the determined diagnosis mode is satisfied, a signal may be configured to transmitted to the EMS to allow the EMS to diagnose the oxygen sensor. The EMS may transmit a corresponding signal to the hybrid controller (HCU) to allow the hybrid controller (HCU) to recognize that the oxygen sensor may be diagnosed. Additionally, the oxygen sensor may be diagnosed under the control of the hybrid controller (HCU). For example, the condition for diagnosing the oxygen sensor may correspond to disengagement of fuel injection and the revolution per minute (RPM) of the engine that corresponds to a predetermined value or greater.

The diagnosis inducing reference value may be a diagnosis index value less than an oxygen sensor diagnosis index in a normal mode and may be a value by which the oxygen sensor is required to be induced based on a vehicle state (e.g., an SOC of a battery and a regenerative brake power condition). The compulsory diagnosis reference value may be a diagnosis index value less than the oxygen sensor diagnosis index in the normal mode and may be less than a diagnosis inducing reference value and may be a value by which the oxygen sensor is required to be compulsorily induced regardless of the vehicle.

Generally, the oxygen sensor automatically diagnosed inducement of a diagnosis of the oxygen sensor or compulsorily diagnose the oxygen sensor may be unnecessary. Additionally, the diagnosis inducing reference value and the compulsory diagnosis reference value may be determined by multiples of the minimum acceptable in-use monitor performance ratio that may be determined by the rules related to the rate base monitoring (RBM), and the multiples refer to safety factors determined to satisfy the performance ratio determined by the rules. For example, when the performance ratio is about 0.125, the oxygen sensor diagnosis index (e.g., the compulsory diagnosis reference value) for the compulsory diagnosis mode may be about 0.125×2 (safety factor: 2)=0.25, and the oxygen sensor diagnosis index (e.g., the diagnosis inducing reference value) for the diagnosis inducing mode may be about 0.125×4 (safety factor: 4)=0.5. For reference, in the normal mode, the oxygen sensor diagnosis index may be about 1.

When the oxygen sensor diagnosis index is lower than a predetermined level after calculation of the oxygen sensor diagnosis index, the hybrid controller (HCU) may be configured to convert the diagnosis mode of the oxygen sensor into the diagnosis inducing mode to increase the number of diagnoses of the oxygen sensor and induce an increase of the oxygen sensor diagnosis index. In particular, when the oxygen sensor diagnosis index decreases while failing to increase in the diagnosis inducing mode, the hybrid controller (HCU) may be configured to convert the diagnosis mode of the oxygen sensor into the compulsory diagnosis mode to compulsorily increase the number of diagnoses of the oxygen sensor and increase the oxygen sensor diagnosis index.

When the known denominator condition, (e.g., a predetermined vehicle state condition) is satisfied the denominator may increase and the oxygen sensor diagnosis index may decrease, the hybrid controller (HCU) may perform a suitable control based on an oxygen sensor diagnosis mode determined by the oxygen sensor diagnosis index. For example, the denominator condition may be determined by the rules related to the rate base monitoring (RBM), and may include the maintenance of a trip of greater than about 10 minutes, an elevation of less than about 8000 feet, an ambient temperature of greater than about 20 F, an operation time of greater than 5 minutes at about 25 mph or more, and at least one idle state of about 30 seconds or greater. When the calculated oxygen sensor diagnosis index is less than a reference value (e.g., the oxygen sensor diagnosis index of the normal mode), the hybrid controller may be configured to restrict an allowance of the regenerative brake to a predetermined condition while the vehicle is coasting.

Generally, the hybrid electric vehicle retrieves energy through a regenerative brake in a coasting state, and a physical coupling between the engine and the driving motor (e.g., an engine clutch for transmitting power of the engine to a motor shaft) may be released and the engine speed condition does not meet a condition for a diagnosis for the oxygen sensor, preventing diagnosis of the oxygen sensor.

Accordingly, when the oxygen sensor diagnosis index decreases and the oxygen sensor diagnosis mode is converted into a diagnosis inducing mode during a coasting operation, the hybrid controller may be configured to allow a regenerative brake in a condition of less an SOC of a predetermined battery and greater than a predetermined regenerative brake. In other words, when the SOC of the battery is less than a predetermined value that requires charging and the regenerative brake power (e.g., regenerative brake torque) is greater than a predetermined value by which fuel ratio may be improved through the regenerative brake, the hybrid controller may be configured to release the engine clutch and may be configured to allow the vehicle to be driven in an electric vehicle (EV) mode such that the energy may be retrieved by the regenerative brake. When the SOC condition of the battery and the regenerative brake power condition are recognized and a condition in which the SOC of the battery is a predetermined value or less and the condition in which the regenerative brake power (e.g., regenerative brake torque) is a predetermined value or greater is dissatisfied, disengagement of the fuel injection may be maintained i and the engine clutch may be connected and the vehicle may be driven in a passive mode. Diagnosis of the oxygen sensor may be induced by satisfying the condition for the diagnosis of the oxygen sensor.

The diagnosis inducing mode requires a diagnosis of the oxygen sensor however, diagnosis of the oxygen sensor may be abandoned to improve fuel ratio through the regenerative brake when the amount of charged power of the battery is substantial, for example, the regenerative brake power may be a predetermined value. In a condition in which the SOC of the battery is a predetermined value or less and in a condition in which the regenerative brake power is a predetermined value or more, a value determined through a preliminary experiment and an evaluation in a real vehicle condition may be used as the predetermined values.

When the vehicle is driven in an electric vehicle mode (e.g., the fuel injection is switched off and the engine clutch is released) in the coasting driving state, a regenerative brake torque that corresponds to the engine frictional torque may be generated compared to when the vehicle is driven in a passive mode (e.g., the fuel injection is switched off and the engine clutch is connected). In other words, when the vehicle may be driven in an electric vehicle mode in the coasting driving state, a regenerative brake torque that corresponds to the engine frictional torque may be generated. Accordingly, the vehicle may be driven restrictively in a passive mode when an oxygen sensor requires diagnosis while the vehicle is coasting, and the vehicle is driven in an electric vehicle mode in a normal driving state thereby improving the fuel ratio. For example, when the oxygen sensor is diagnosed in a diagnosis inducing mode, the hybrid controller may be configured to select one of an electric vehicle mode and a passive mode in consideration of the SOC condition of the battery and the regenerative brake power generated when the vehicle is coasting (see FIG. 3).

When the oxygen sensor diagnosis index decreases and the oxygen sensor diagnosis mode is converted into a compulsory diagnosis mode while the vehicle is coasting, the hybrid controller may be configured to restrict (prohibits) the regenerative brake regardless of the SOC condition of the battery and the regenerative brake power condition. Accordingly the vehicle may be driven in a passive mode by maintaining the disengagement of the fuel injection (e.g., the engine fuel is interrupted) and connecting the engine clutch to satisfy a condition for a diagnosis of the oxygen sensor and thus induce the diagnosis of the oxygen sensor. When the RPM of the engine equals a predetermined value or greater, the engine clutch may be connected to restrict the regenerative brake, and when the RPM of the engine is a predetermined value or less, the engine clutch may be released and the RPM of the engine may be maintained at a predetermined value or more by the HSG inducing diagnosis of the oxygen sensor. When the vehicle is driven in a passive mode, the engine may be driven by the power transmitted from a wheel of the vehicle, and an engine speed (RPM) condition that diagnosis the oxygen sensor may be satisfied.

Figure 3:
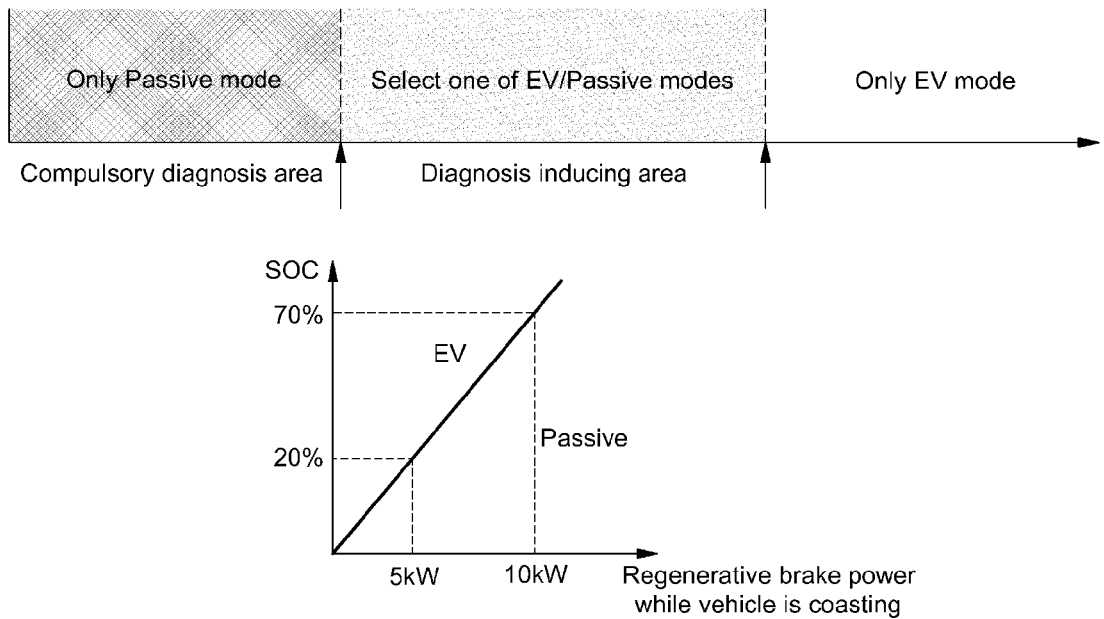
FIG. 3 is an exemplary view illustrating a travel mode for conversion to an oxygen sensor diagnosis mode determined according to an exemplary embodiment of the present invention.

Referring to FIG. 3, when the oxygen sensor is diagnosed in a normal mode, the hybrid controller may be configured to allow the vehicle to be driven in an electric vehicle mode, and when the oxygen sensor is diagnosed in a diagnosis inducing mode, the vehicle may be driven in an electric vehicle mode or a passive mode based on the battery SOC condition and the regenerative brake power condition. Additionally, when the oxygen sensor is diagnosed in a compulsory diagnosis mode, the vehicle may be restricted to be driven in a passive mode.

For example, the electric vehicle mode allows the fuel injection of the hybrid vehicle to be disengaged and the motor may be driven in a state in which the engine clutch releases, the passive mode allows the fuel injection of the hybrid vehicle to be disengaged and the engine may be driven by the power transmitted from a wheel of the vehicle through connection of the engine clutch, and the coasting mode (coasting driving) allows the fuel injection to be disengaged in a driving state (e.g., the vehicle is driven at a certain speed) and the vehicle may be driven by the speed of the vehicle.

Figure 4:
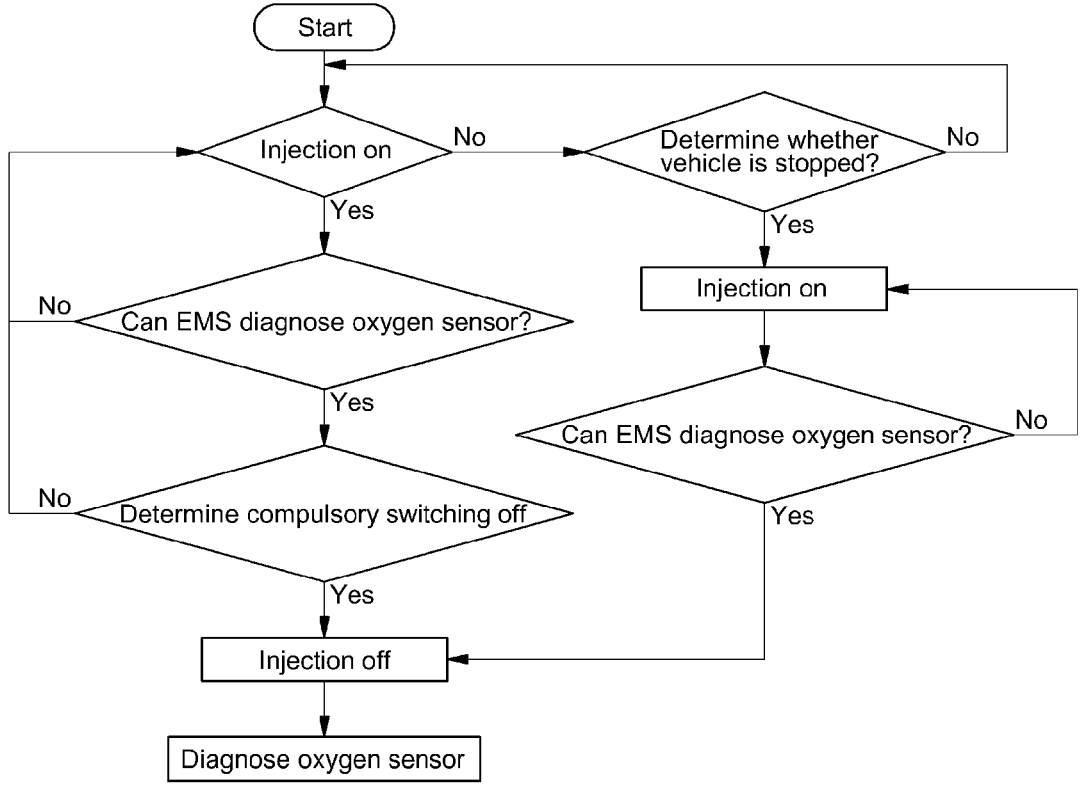
FIG. 4 is an exemplary flowchart illustrating an oxygen sensor diagnosis control process of an HEV according to an exemplary embodiment of the present invention.

Referring to FIG. 4, when the fuel injection is engaged while the vehicle travels and determines that EMS may diagnose the oxygen sensor based on a signal received by the EMS when the diagnosis mode of the oxygen sensor is in a compulsory diagnosis mode, the hybrid controller compulsorily disengages the fuel injection of an engine to satisfy a condition for diagnosing the oxygen sensor so that the oxygen sensor may be made to be diagnosed by the EMS to induce the diagnosis of the oxygen sensor. Accordingly, as the vehicle coasts while the fuel injection is disengaged, a condition for diagnosing the oxygen sensor (e.g., switching off of the fuel injection and the engine speed) may be satisfied.

When the vehicle is stopped and the fuel injection is disengaged when the diagnosis mode of the oxygen sensor may be converted into a compulsory diagnosis mode, the hybrid controller compulsorily (unconditionally) may be configured to operate the engine using a hybrid starter generator (HSG) for operating the engine and engages the fuel injection of the engine. When the EMS diagnoses the oxygen sensor based on a signal received by the EMS, the hybrid controller may be configured to disengage the fuel injection to allow the oxygen sensor to be diagnosed by the EMS (e.g., by satisfying a condition for diagnosing the oxygen sensor), to induce the diagnosis of the oxygen sensor. Further, as the engine rotates by the inertial force while the fuel injection is disengaged, a condition for diagnosing the oxygen sensor (switching-off of the fuel injection and the engine speed) may be satisfied.

For example, when the vehicle is driven by operating the engine, the engine may function due to the SOC of the battery and the operation of the full automatic temperature control (FATC). The oxygen sensor may be diagnosed by compulsorily restricting the fuel injection of the engine based on the request for the diagnosis of the oxygen sensor due to the compulsory diagnosis mode. When the vehicle is stopped, the oxygen sensor may be diagnosed by operating the engine using the hybrid starter generator (HSG) and disengaging the fuel injection.

Although the present invention have been described in detail, the scope of the present invention is not limited thereto but various modifications and improvements made by those skilled in the art using the basic concept of the present invention defined in the claims also fall within the scope of the present invention.

What is claimed is:

1. An oxygen sensor diagnosis control system of a hybrid electric vehicle comprising:
    a memory configured to store program instructions; and
    a hybrid controller configured to execute the program instructions, the program instructions when executed configured to: to control an oxygen sensor diagnosis function of a vehicle, wherein the hybrid controller is configured to determine conversion of an oxygen sensor diagnosis mode based on a result obtained by calculating an oxygen sensor diagnosis index, and configured to determine whether a condition for diagnosing an oxygen sensor is satisfied when the oxygen sensor diagnosis index is lower than a predetermined level to initiate a diagnosis inducing mode or a compulsory diagnosis mode.

2. The oxygen sensor diagnosis control system of claim 1, wherein when any one of a plurality of conditions having a state of charge (SOC) of a battery with a predetermined value or less and a condition having a regenerative brake power with a predetermined value or greater is dissatisfied the oxygen sensor diagnosis index decreases and initiates the diagnosis inducing mode while the vehicle is coasting,
    the hybrid controller is configured to maintain the disengagement of a fuel injection of an engine and connect an engine clutch to satisfy a condition for inducing diagnosis of the oxygen sensor.

3. The oxygen sensor diagnosis control system of claim 1, wherein when the oxygen sensor diagnosis index decreases and initiates the compulsory diagnosis mode while the vehicle is coasting, the hybrid controller is configured to restrict the regenerative brake, connect the engine clutch, and maintain engagement of the fuel injection to satisfy a condition for diagnosing the oxygen sensor to induce diagnosis of the oxygen sensor.

4. The oxygen sensor diagnosis control system of claim 1, wherein when the fuel injection is engaged and an Engine Management System (EMS) diagnoses the oxygen sensor when the oxygen sensor diagnosis index decreases and initiates the compulsory diagnosis mode, the hybrid controller is configured to disengage the fuel injection to induce the diagnosis of the oxygen sensor.

5. The oxygen sensor diagnosis control system of claim 1, wherein when the fuel injection is in an off state and the vehicle is stopped the oxygen sensor diagnosis index decreases and the compulsory diagnosis mode is initiated, the hybrid controller is configured to operate the engine to engage the fuel injection of the engine, and when the EMS diagnoses the oxygen sensor, the hybrid controller disengages the fuel injection thereby inducing diagnosis of the oxygen sensor.

6. An oxygen sensor diagnosis apparatus of claim 1, further comprising:
    a battery with a state of charge with a predetermined value or less and a condition having a regenerative brake power with a predetermined value or greater is dissatisfied the oxygen sensor diagnosis index decreases and initiates the diagnosis inducing mode while the vehicle is coasting.

7. An oxygen sensor diagnosis apparatus of a hybrid electric vehicle, comprising:

a hybrid controller configured to operate an overall function of a vehicle; and an oxygen sensor configured to calculate an oxygen sensor diagnosis index, wherein the hybrid controller is configured to determine whether a condition for diagnosing an oxygen sensor is satisfied when the oxygen sensor diagnosis index decreases and initiate a diagnosis inducing mode or a compulsory diagnosis mode.

* * * * *